(12) United States Patent
Takenouchi et al.

(10) Patent No.: US 7,938,495 B2
(45) Date of Patent: May 10, 2011

(54) BRAKE SYSTEM FOR MOTORCYCLE

(75) Inventors: Kazuya Takenouchi, Saitama (JP); Masanobu Nakayama, Saitama (JP); Hideo Takahashi, Saitama (JP); Kazuhiko Tani, Saitama (JP); Masaie Kato, Saitama (JP); Yutaka Nishikawa, Saitama (JP)

(73) Assignee: Honda Motor Co.,, Tokyo (JP)

( * ) Notice: Subject to any disclaimer, the term of this patent is extended or adjusted under 35 U.S.C. 154(b) by 909 days.

(21) Appl. No.: 11/729,809

(22) Filed: Mar. 30, 2007

(65) Prior Publication Data

US 2007/0228819 A1    Oct. 4, 2007

(30) Foreign Application Priority Data

Mar. 31, 2006  (JP) .................. 2006-096583

(51) Int. Cl.
  *B60T 8/32*  (2006.01)
(52) U.S. Cl. ...................... 303/137; 303/9.63
(58) Field of Classification Search ............. 303/3, 9.63, 303/137, 145, 154, 186, 116.2, 119.1, 119.2, 303/DIG. 2, DIG. 4
See application file for complete search history.

(56) References Cited

U.S. PATENT DOCUMENTS

| 5,249,848 | A  | * | 10/1993 | Matsuto et al. | ............... 303/163 |
| 6,543,859 | B2 | * | 4/2003  | Sakamoto       | .................. 303/113.2 |
| 6,585,332 | B2 | * | 7/2003  | Kusano et al.  | ............. 303/113.4 |
| 6,685,278 | B2 | * | 2/2004  | Kusano et al.  | ............. 303/113.4 |

FOREIGN PATENT DOCUMENTS

JP    2001-310717 A    11/2001

* cited by examiner

*Primary Examiner* — Xuan Lan Nguyen
(74) *Attorney, Agent, or Firm* — Birch, Stewart, Kolasch & Birch, LLP

(57) ABSTRACT

A motorcycle brake system enables a smooth switching to a hydraulic loss simulator to provide an improved feeling of braking operation. A brake operating unit includes a brake caliper, an electromagnetic on-off valve (V1) which blocks a main brake passage, a pressure sensor, a hydraulic modulator, and a hydraulic loss simulator. The brake system allocates a braking force to front and rear wheels by controlling the hydraulic modulator based on a result of detection by the pressure sensor. The brake operating unit has a brake light switch for detecting the starting of operation thereof, actuates an electromagnetic on-off valve (V1) to block the main brake passage based on a result of detection by the brake light switch, and unblocks the main brake passage when a predetermined amount of time elapses without any input made to the pressure sensor in a standby state with the main brake passage blocked.

28 Claims, 9 Drawing Sheets

BRAKE SYSTEM FOR MOTORCYCLE

CROSS-REFERENCE TO RELATED APPLICATIONS

The present application claims priority under 35 USC 119 to Japanese Patent Application No. 2006-096583 filed on Mar. 31, 2006 the entire contents of which are hereby incorporated by reference.

BACKGROUND OF THE INVENTION

1. Field of the Invention

The present invention relates to a motorcycle brake system.

2. Description of Background Art

A by-wire brake system is known, wherein hydraulic pressure generated by a master cylinder included in a brake operating unit is detected by a hydraulic sensor, and a modulator is controlled based on a result of detection by the hydraulic sensor to apply hydraulic pressure to a brake caliper. In such a by-wire brake system, when it is determined based on a result of detection by a hydraulic sensor that braking is not being performed, a master cylinder and a brake caliper are kept in communication with each other via a hydraulic pipe. When it is determined that braking is being performed, an on-off valve blocks the hydraulic pipe that connects the master cylinder and the brake caliper, and a modulator applies hydraulic pressure to the brake caliper. While hydraulic pressure is applied to the brake caliper by the modulator with the on-off valve blocking the hydraulic pipe, a hydraulic loss simulator applies hydraulic pressure to the master cylinder. As a result, a pseudo reaction force is applied to the brake lever or brake pedal so as not to cause the rider to have an uncomfortable feeling.

In recent years, a motorcycle brake system which operates as described above, has been proposed wherein an on-off valve is controlled based on a result of the detection by a switch provided for a brake pedal. See, for example, JP-A No. 2001-310717.

However, in the motorcycle brake system referred to above when the rider keeps driving while putting his or her fingers on the brake lever or putting his or her foot on the brake pedal, the switch may be kept on even with no brake hydraulic pressure generated. A problem results in such a case wherein the on-off valve is kept closed, causing an increase in power consumption.

SUMMARY AND OBJECTS OF THE INVENTION

According to an embodiment of the present invention, a motorcycle brake system is provided wherein switching to a hydraulic loss simulator is made based on a result of detection not by a hydraulic sensor but by a switch while preventing the power consumption from increasing.

To address the above problem, the motorcycle brake system according to an embodiment of the present invention includes a brake operating unit 2 which makes a master cylinder 3 generate hydraulic pressure. A braking unit, for example, the brake caliper 4, is provided for applying a braking force corresponding to a supplied hydraulic pressure to a wheel. An on-off valve, for example, the first electromagnetic on-off valve V1 in an embodiment of the invention, is provided for blocking a brake passage 5 connecting the brake operating unit and the braking unit, thereby isolating a portion on the brake operating unit side of the brake passage and a portion on the braking unit side of the brake passage from each other. A hydraulic sensor, for example, the pressure sensor 28 in an embodiment of the invention, is provided on the brake operating unit side of the brake passage for detecting hydraulic pressure. A modulator, for example, the hydraulic modulator 6 in an embodiment of the invention, is provided for supplying a predetermined amount of hydraulic pressure to the braking unit based on a result of the detection by the hydraulic sensor. A hydraulic loss simulator 9 is provided for supplying a reaction force to the brake operating unit when the brake passage is blocked with the motorcycle brake system allocating a braking force to front and rear wheels by controlling the modulator based on a result of detection by the hydraulic sensor. In the motorcycle brake system, the brake operating unit has a switch, for example, the brake light switch 32 in an embodiment of the invention, for detecting the starting of the operation thereof, and the on-off valve blocks the brake passage based on a result of detection by the switch and unblocks the brake passage when a predetermined amount of time elapses without any input made to the hydraulic sensor in a standby state with the brake passage blocked.

The above configuration makes it possible to promptly detect the starting of the operation of the brake operating unit regardless of the hydraulic pressure in the brake passage and block the brake passage using an on-off valve, so that the hydraulic loss simulator can be activated earlier than in other configurations.

In addition, it is possible, while smoothly increasing the operating force in response to the increase in the stroke of the brake operating unit, to control the modulator based on the result of detection by the hydraulic sensor and to provide the braking unit with a predetermined amount of hydraulic pressure.

Furthermore, in a case in which braking operation has been detected with the rider driving the motorcycle with his or her fingers lightly placed on the brake operating unit without any intention to operate it, the standby state of the on-off valve is canceled upon the elapsing of a predetermined amount of time.

According to an embodiment of the present invention, the motorcycle brake system provides a switch which is a brake light switch for illuminating a brake light.

Such a configuration makes it possible to use the brake light switch also as a switch for detecting the starting of the braking operation.

According to an embodiment of the present invention, in the motorcycle brake system when a predetermined amount of pressure is detected by the hydraulic pressure sensor, the operation of the on-off valve is started regardless of the result of the detection by the switch, and the modulator supplies a predetermined amount of hydraulic pressure to the braking unit.

Such a configuration makes it possible to control the braking based on a result of the detection by the hydraulic sensor even in a case in which the hydraulic pressure is generated after the standby state of the on-off valve is canceled with, for whatever reason, no input received from the switch.

According to an embodiment of the present invention, the switch includes a stroke sensor 66 for detecting a manipulated variable of the braking by moving in a direction of the stroke extension.

In such a configuration, the operating load of the brake lever does not increase, and the stroke sensor is not subjected to an excessive force even if the brake lever contacts the ground.

According to an embodiment of the present invention, the stroke sensor is disposed downwardly of the master cylinder.

Such a configuration makes the brake system less likely to be affected by the steering of the handlebar.

According to an embodiment of the present invention, the stroke sensor is disposed such that the direction of the stroke extension is substantially perpendicular to an axial direction of the master cylinder.

In such a configuration, configurations along the axial direction of the master cylinder and along the direction of stroke extension can be made compact, respectively.

According to an embodiment of the present invention, the stroke sensor is journalled to a rotary shaft, for example, the pivot bolt 61, of a brake lever included in the brake operating unit and is caused, by an arm member, for example, the extension arm 71, integrally turning with the brake lever, to move along a stroke.

Such a configuration allows the stroke sensor to linearly move along a stroke corresponding to the turning of the brake lever.

According to an embodiment of the present invention, it is possible to promptly detect the starting of the operation of the brake operating unit regardless of the hydraulic pressure in the brake passage, block the brake passage using an on-off valve, and operate the hydraulic loss simulator. This results in an advantageous effect that the rider can have a good feeling of braking equivalent to the corresponding feeling obtained in a related art brake system in which the master cylinder and the brake caliper are connected via a hydraulic passage.

There is another advantageous effect that it is possible, while smoothly increasing the operating force in response to the increase in the stroke of the brake operating unit, to control the modulator based on a result of detection by the hydraulic sensor and provide the braking unit with a predetermined amount of hydraulic pressure, thereby enabling a braking force control with higher accuracy.

There is still another advantageous effect that, in a case in which braking operation has been detected with the rider driving the motorcycle with his or her fingers lightly placed on the brake operating unit without any intention to operate it, the standby state of the on-off valve is canceled upon elapsing of a predetermined amount of time, thereby reducing the power consumption by the on-off valve.

According to an embodiment of the present invention, the brake light switch can be used also as a switch for detecting the starting of the braking operation, so that the increase in the number of components can be suppressed.

According to an embodiment of the present invention, braking can be controlled based on a result of the detection by the hydraulic sensor even in a case in which, for whatever reason, no input is received from the switch.

According to an embodiment of the present invention, the operating load of the brake lever does not increase, and the stroke sensor is not subjected to an excessive force even if the brake lever contacts the ground, so that the stroke sensor can be prevented from being broken without impairing the operability of the brake lever.

According to an embodiment of the present invention, the brake system can be made less likely to be affected by the steering of the handlebar, so that the rider is not caused to have an uncomfortable feeling.

According to an embodiment of the present invention, configurations along the axial direction of the master cylinder and along the direction of stroke extension of the sensor can be made compact, respectively, so that the merchantability of the brake system can be improved without impairing its external look.

According to an embodiment of the present invention, the stroke sensor can be linearly moved along a stroke corresponding to the turning of the brake lever, so that brake lever operation can be detected with higher accuracy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A first embodiment of the present invention will be described with reference to drawings.

Figure 1:
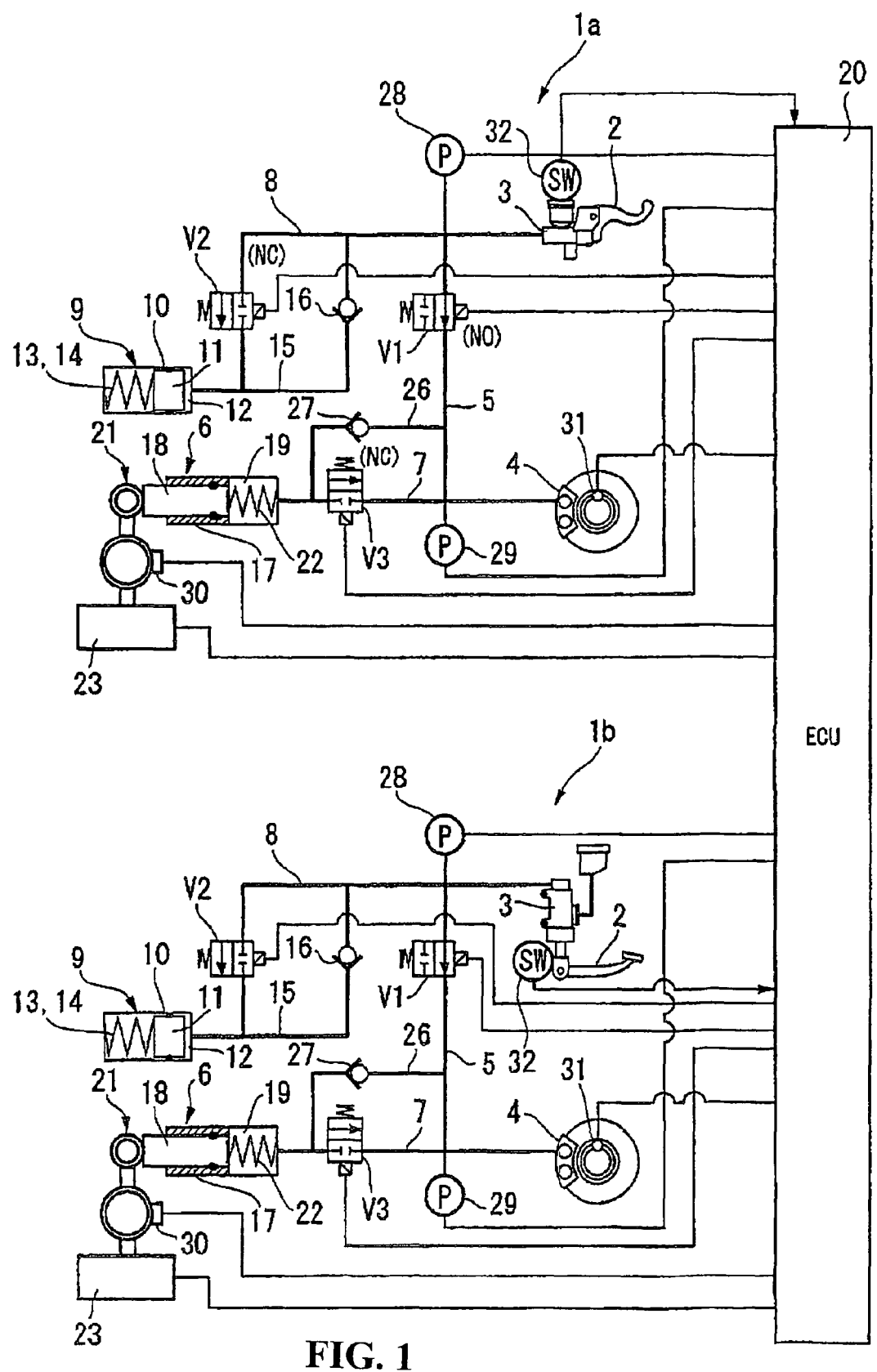
FIG. 1 is a hydraulic circuit diagram of a motorcycle brake system according to a first embodiment of the present invention.

FIG. 1 is a hydraulic circuit diagram of a motorcycle brake system according to a first embodiment of the present invention. As shown, the brake system of the first embodiment includes a front wheel brake circuit 1*a* and a rear wheel brake circuit 1b linked with a controller (ECU) 20. The front wheel brake circuit 1a and the rear wheel brake circuit 1b are independent of each other.

A brake operation to use the front wheel brake circuit 1a is performed using a brake operating unit 2, that is, in this case, a brake lever. A brake operation to use the rear wheel brake circuit 1b is performed using a brake operating unit 2, that is, in this case, a brake pedal. In other respects, the front wheel brake circuit 1a and the rear wheel brake circuit 1b are configured almost identically, so that, of the two brake circuits, only the front wheel brake circuit 1a will be described in detail in the following. As for the rear wheel brake circuit 1b, their parts corresponding to those in the front wheel brake circuit 1a are denoted by the same reference numerals as used for the front wheel brake circuit 1a and overlapping descriptions are omitted.

The present brake system uses a by-wire system for both the front wheel and rear wheel brake circuits. The manipulated variable (i.e. the hydraulic pressure in the case of the first embodiment) of a brake operating unit such as the brake lever is electrically detected. A braking force is then generated using a hydraulic pressure generated by a hydraulic modulator based on the detected amount.

The brake system employs a combined brake system (hereinafter referred to as the "CBS") in which, when a brake operation is performed for either of the front and rear wheels, braking means for the front and rear wheels function in an interlocked manner.

In concrete terms, when the brake operating unit 2 of one of the two brake circuits is operated earlier than the brake operating unit 2 of the other brake circuit, a hydraulic pressure generated by the hydraulic modulator based on the hydraulic pressure of a master cylinder is applied to a brake caliper by the by-wire system in the earlier-operated brake circuit. In the other brake circuit, too, a hydraulic pressure is generated by the hydraulic modulator based on the master cylinder pressure of the earlier-operated brake circuit and is applied to a brake caliper by the by-wire system.

The brake system employs an ABS system.

Each of the brake circuits 1a and 1b includes a master cylinder 3 interlocked with the brake operating unit 2, and a brake caliper (braking means) 4 corresponding to the master cylinder 3, the master cylinder 3 and the brake caliper 4 being connected via a main brake passage 5. A supply and drain passage 7 leading from a hydraulic modulator 6, described later, joins the main brake passage 5 at a point between the master cylinder 3 and the brake caliper 4.

A first electromagnetic on-off valve (on-off valve) V1 of a normally open (NO) type is disposed in a portion, between where the supply and drain passage 7 joins the main brake passage 5 and the master cylinder 3, of the main brake passage 5. The on-off valve V1 operates to make the master cylinder 3 and the brake caliper 4 communicate with each other or isolated from each other. A branch passage 8 is also connected to the same portion of the main brake passage 5. A hydraulic loss simulator 9 is connected to the branch passage 8 via a second electromagnetic on-off valve V2 of a normally closed (NC) type. The hydraulic loss simulator 9 applies, when the main brake passage 5 is blocked by the first electromagnetic on-off valve V1, a pseudo hydraulic reaction force corresponding to the amount of operation of the brake operating unit 2 to the master cylinder 3. When such a reaction force is to be applied to the master cylinder 3, the second electromagnetic on-off valve V2 opens the branch passage 8 making the master cylinder 3 and the hydraulic loss simulator 9 communicated with each other.

The hydraulic loss simulator 9 includes a cylinder 10 for housing a piston 11 to be axially freely movable. A hydraulic chamber 12 to receive hydraulic fluid flowing in from the master cylinder 3 is formed between the cylinder 10 and the piston 11. A coil spring 13 and a resin spring 14 differing in characteristic from each other are serially disposed behind the piston 11. The coil spring 13 and the resin spring 14 are designed to apply a reaction force which rises initially gently and then sharply at a stroke end portion to the piston 11, namely, to the brake operating unit 2.

The branch passage 8 is provided with a bypass passage 15 bypassing the second electromagnetic on-off valve V2. The bypass passage 15 is provided with a check valve 16 for allowing the hydraulic fluid to flow from the hydraulic loss simulator 9 toward the master cylinder 3.

The hydraulic modulator 6 is provided with a cam mechanism 21, a return spring 22, and an electric motor 23. The cam mechanism 21 pushes a piston 18 housed in a cylinder 17 toward a hydraulic chamber 19 formed between the cylinder 17 and the piston 18. The return spring 22 keeps the piston 18 pushed against the cam mechanism 21. The electric motor 23 operates the cam mechanism 21. The hydraulic chamber 19 is communicated with the supply and drain passage 7. The hydraulic modulator 6 can increase or decrease the pressure in the hydraulic chamber 19 so as to increase or decrease the braking force of the brake caliper 4. To do so, the hydraulic modulator 6 presses the piston 18 based on an initial position of the cylinder 17 via the cam mechanism 21 operated by the electric motor 23, or pushes the piston 18 back using the return spring 22.

The electric motor 23, by adjusting the amount of electric current that is determined based on an input duty ratio (ON time/(ON time+OFF time)) under PWM control, electrically and accurately adjusts the position of the piston 18 that is determined by the rotational position of the cam mechanism 21 so as to adjust the pressure in the hydraulic chamber 19.

Therefore, both CBS control in which hydraulic fluid is positively supplied to the main brake passage 5, namely, to the brake caliper 4, and ABS control in which the pressure in the hydraulic chamber 19 is decreased, maintained, and increased again by moving the piston 18 back and forth are enabled.

A third electromagnetic on-off valve V3 of a normally closed (NC) type is disposed on the supply and drain passage 7. A bypass passage 26 bypassing the third electromagnetic valve V3 is connected to the supply and drain passage 7. The bypass passage 26 is provided with a check valve 27 which allows the hydraulic fluid to flow from the hydraulic modulator 6 toward the brake caliper 4.

In the brake circuit 1a of the front wheel side and the brake circuit 1b of the rear wheel side, a pressure sensor (P) 28 and a pressure sensor (P) 29 are disposed on both sides of the first electromagnetic on-off valve V1. The pressure sensor (P) 28 is on the master cylinder 3 side, i.e. on the input side. The pressure sensor (P) 29 is on the brake caliper 4 side, i.e. on the output side. A cam shaft (not shown) of the cam mechanism 21 is provided with an angle sensor 30 used to feed back angle information. The brake caliper 4 is provided with a wheel speed sensor 31 for wheel speed detection. The minimum detectable pressure of the pressure sensor 28 is, for example, about 0.05 MPa. The stroke length corresponding to the minimum detectable pressure of the lever or pedal of the brake operating unit 2 is about 8 mm.

The brake operating unit 2 is provided with a brake light switch 32 which is connected to a brake light (not shown). When the lever or pedal of the brake operating unit 2 is operated, a contact of the brake light switch 32 closes and power is supplied to the brake light. The brake light switch 32 is also connected to the controller 20, and an ON/OFF signal indicating whether the contact of the brake light switch 32 is closed or open is inputted to the controller 20. When the brake operating unit 2 is operated, the brake light switch 32 detects the operation and outputs an ON signal. At this time, the brake light switch 32 can detect the operation while the length of the stroke traveled by the lever or pedal of the brake operating unit 2 is still smaller, for example, about 4 mm, than required by the pressure sensor 28 to detect the operation.

Based on the signal detected by the brake light switch 32, the controller 20 controls the first, second, and third electromagnetic on-off valves V1, V2, and V3 to open or close them. The controller 20 also controls the electric motor 23 based on the signals detected by the pressure sensors 28 and 29, the angle sensor 30, and the wheel speed sensor 31.

In concrete terms, when the operation of the brake operating unit 2 is detected by the brake light switch 32 in either one of the brake circuits, the first electromagnetic on-off valve V1 in each of the brake circuits is, in accordance with a command from the controller 20, kept in a position for closing the main brake passage 5. At the same time, also in each of the brake circuits, the second and third electromagnetic on-off valves V2 and V3 are kept in an open position, that is, they are kept in a standby state. Subsequently, the controller 20 receives information on the front and rear wheel speeds from the respective wheel speed sensors 31 and information on the manipulated variable of braking via the respective pressure sensors 28. The hydraulic modulator 6 in each of the brake circuits then provides, in accordance with a command from the controller 20, the brake caliper 4 with a hydraulic pressure corresponding to the condition of vehicle operation and the manipulated variable of braking to the brake caliper 4.

When a predetermined amount of time elapses with the first to third electromagnetic on-off valves V1 to V3 in the standby state, in which the first electromagnetic on-off valve V1 is kept in a position for closing the main brake passage 5 and the second and third electromagnetic on-off valves V2 and V3 are kept in an open position, and without any detectable pressure inputted to either of the pressure sensors 28, the controller 20 determines that no braking is intended by the rider and releases the first to third electromagnetic on-off valves V1 to V3 from the standby state by putting the first electromagnetic on-off valve V1 in an open position and the second and third electromagnetic on-off valves in a closed position. The predetermined amount of time may be an optional amount of time, based on which the rider can be judged to have no intention of braking. When a predetermined minimum detectable pressure is detected by the hydraulic sensor in either one of the brake circuits, the controller 20 operates the first to third electromagnetic on-off valves V1 to V3 to put them in the standby state in each of the brake circuits, even if no signal is outputted by the brake light switch 32, for example, on account of a malfunction.

The controller 20 sets the higher one of the wheel speeds detected by the front and rear wheel speed sensors 31, as an estimated vehicle speed vr, and calculates a front or rear wheel slip ratio based on the difference between the estimated vehicle speed vr and the front or rear wheel speed. When the front or rear wheel slip ratio exceeds a predetermined threshold slip ratio, the corresponding wheel is judged to be slipping and the ABS control is activated to reduce the hydraulic pressure generated by the corresponding hydraulic modulator 6.

In a related-art motorcycle brake system, whether or not a braking operation is performed is judged based on a result of detection made by the hydraulic sensor provided in the main brake passage 5 on the master cylinder 3 side. In such a configuration, it is after the hydraulic pressure in the main brake passage 5 on the master cylinder 3 side reaches a minimum detectable pressure (for example, about 0.05 MPa) that the first electromagnetic on-off valve V1 blocks the main brake passage 5 to cause the hydraulic loss simulator 9 to start operation. This allows, for example, when the brake operating unit 2 is quickly operated, a time lag to occur before the hydraulic loss simulator 9 starts operation. As a result, the reaction force (operating force) applied to the brake operating unit 2 possibly slackens, failing to steadily increase, while the length of stroke traveled by the lever or pedal of the brake operating unit 2 increases.

The slackening of the operating force will be described in detail with reference to FIG. 4. Shown in FIG. 4 is a case in which the brake operating unit 2 is quickly operated while the brake caliper is cold.

Immediately after operation of the brake operating unit 2 is started with the length of the stroke, represented by the vertical axis, traveled by the brake operating unit 2 still being in a range of 0 to about 5 mm, the range will hereinafter be referred to as the "master cylinder inoperative stroke range," the piston of the brake caliper 4 does not operate. During this period, the operating force (represented by the horizontal axis) of the brake operating unit 2 only slightly increases from about 2N to 3N (represented by the thick broken-line portion of the curve in FIG. 4).

When the traveled length of stroke exceeds 5 mm, the piston of the brake caliper 4 starts moving. While the traveled length of stroke is in a range where, with the piston having started moving, the brake pad disposed in the direction of piston movement is not yet pushed against the brake disk, the range will hereinafter be referred to as the "caliper rollback range, the increase in the operating force of the brake operating unit 2 remains small as in the master cylinder inoperative range. Subsequently, the rate of increase in the operating force starts gradually rising (represented by the thin-line portion of the curve in FIG. 4). The rise in the operating force increase rate is caused when the traveled stroke of the brake operating unit 2 increases causing the brake pad to be pushed against the brake disk. When the rise occurs (at the point marked by a circle in FIG. 4), the minimum detectable pressure (0.05 MPa) is applied to the pressure sensor 28, so that braking is judged to have been started. As a result, the first electromagnetic on-off valve V1 blocks the main brake passage 5, and the hydraulic loss simulator 9 starts the operation, namely, a switching to the hydraulic loss simulator is made. When the temperature of the brake caliper (braking unit) 4 is high, the caliper rollback range expands to extend over a larger length of stroke without allowing the operating force increase rate to start rising, so that the curve representing the operating force increase rate becomes more linear.

Figure 4:
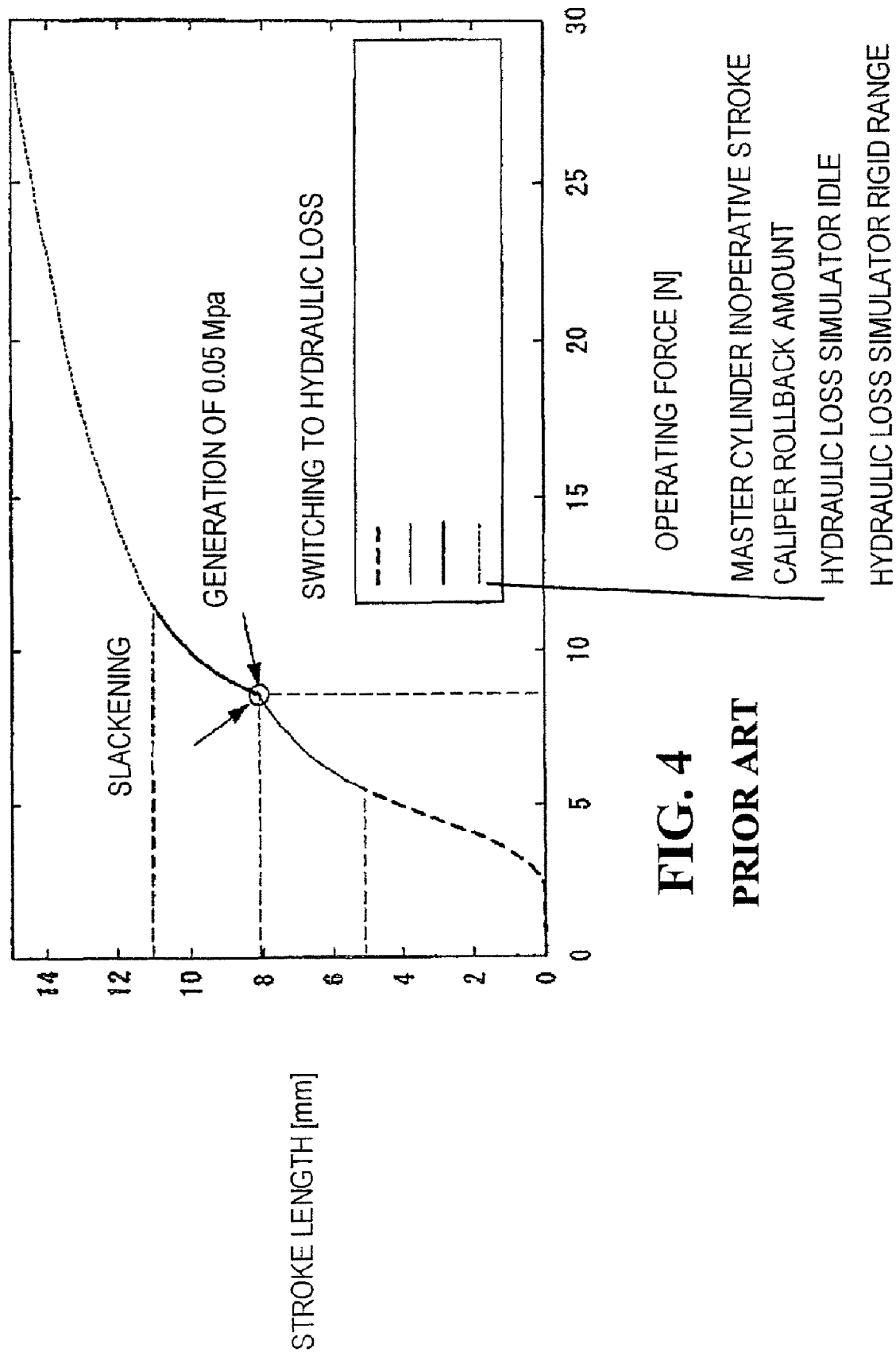
FIG. 4 is a graph, equivalent to the graph shown in FIG. 3, for a related-art motorcycle brake system.
Figure 5:
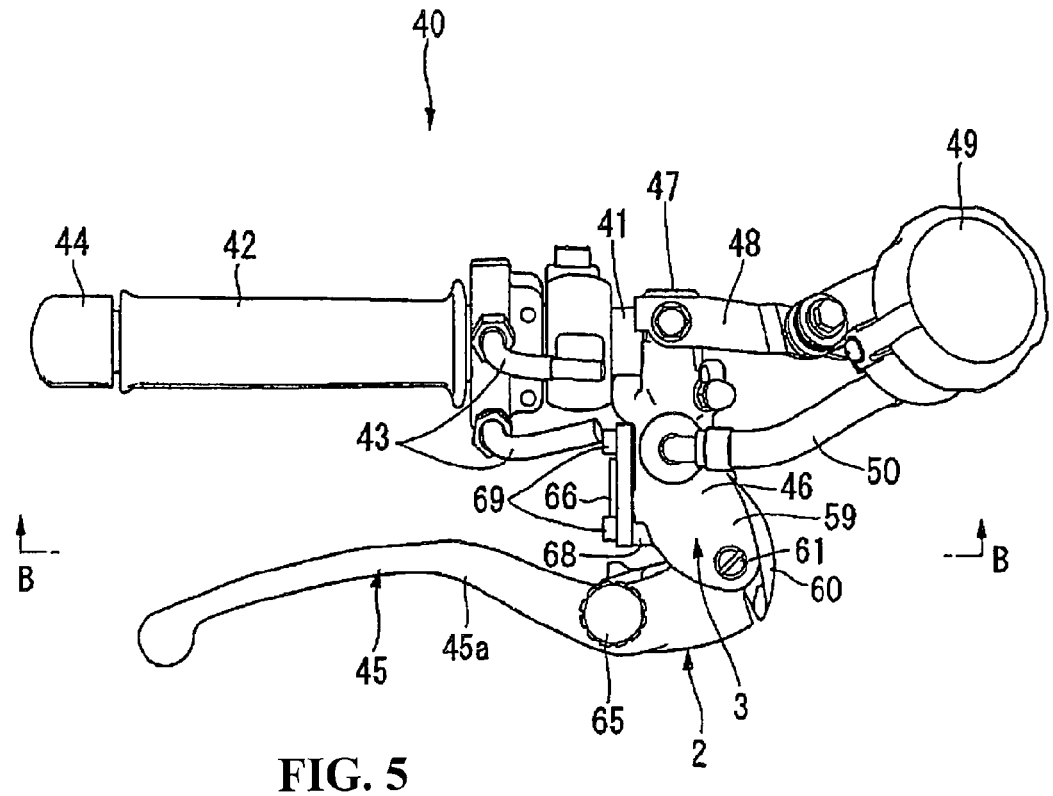
FIG. 5 is a top view of a brake operating unit according to a second embodiment of the present invention.
Figure 6:
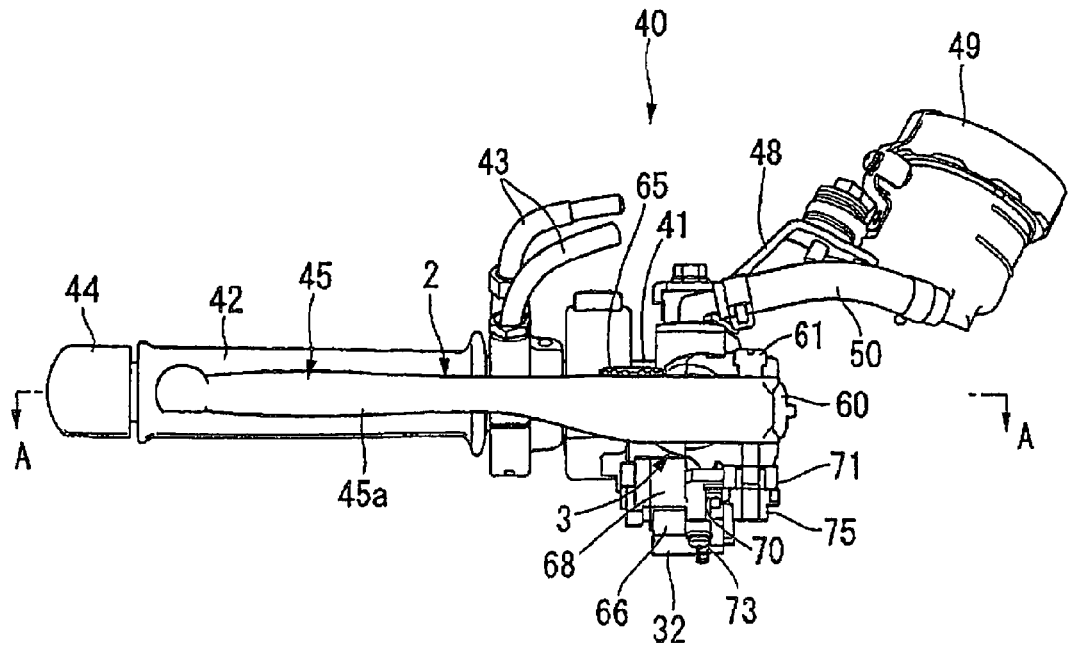
FIG. 6 is a front view of the brake operating unit according to the second embodiment of the present invention.

However, after the traveled length of stroke exceeds 8 mm, the operating force increase rate drops again to remain small until the traveled length of stroke reaches about 11 mm, the range represented by the thick-line portion of the curve in FIG. 4, that is, while the hydraulic loss simulator is in an idle range. Subsequently, the operating force increase rate gradually rises, and, when the traveled length of stroke exceeds 11 mm, the hydraulic pressure from the hydraulic loss simulator 9 starts being steadily applied to the master cylinder 3, entering the range represented by the thin broken-line portion of the curve in FIG. 4, to be hereinafter referred to as the "hydraulic loss simulator rigid range." Subsequently, the operating force of the brake operating unit 2 substantially linearly increases in response to the increase in the manipulated variable of the brake operating unit 2.

As described above, when an upper limit portion of the caliper rollback range is reached in a related-art motorcycle brake system, particularly with the brake caliper 4 being cold, the hydraulic pressure in the main brake passage 5 starts substantially linearly increasing in response to the increase in the manipulated variable of the brake operating unit 2. At the same time as it occurs, the main brake passage 5 is blocked by the first electromagnetic valve, and what provides the operating force of the brake operating unit 2 is switched to the hydraulic loss simulator 9. As a result, the hydraulic loss simulator idle range where the hydraulic pressure increase is small is entered. This creates a step (slackening) in the curve representing the operating force of the brake operating unit 2 relative to the stroke of the brake operating unit 2.

Next, a variation in the operating force of the brake operating unit 2 according to an embodiment of the present invention will be concretely described with reference to FIG. 3.

Figure 3:
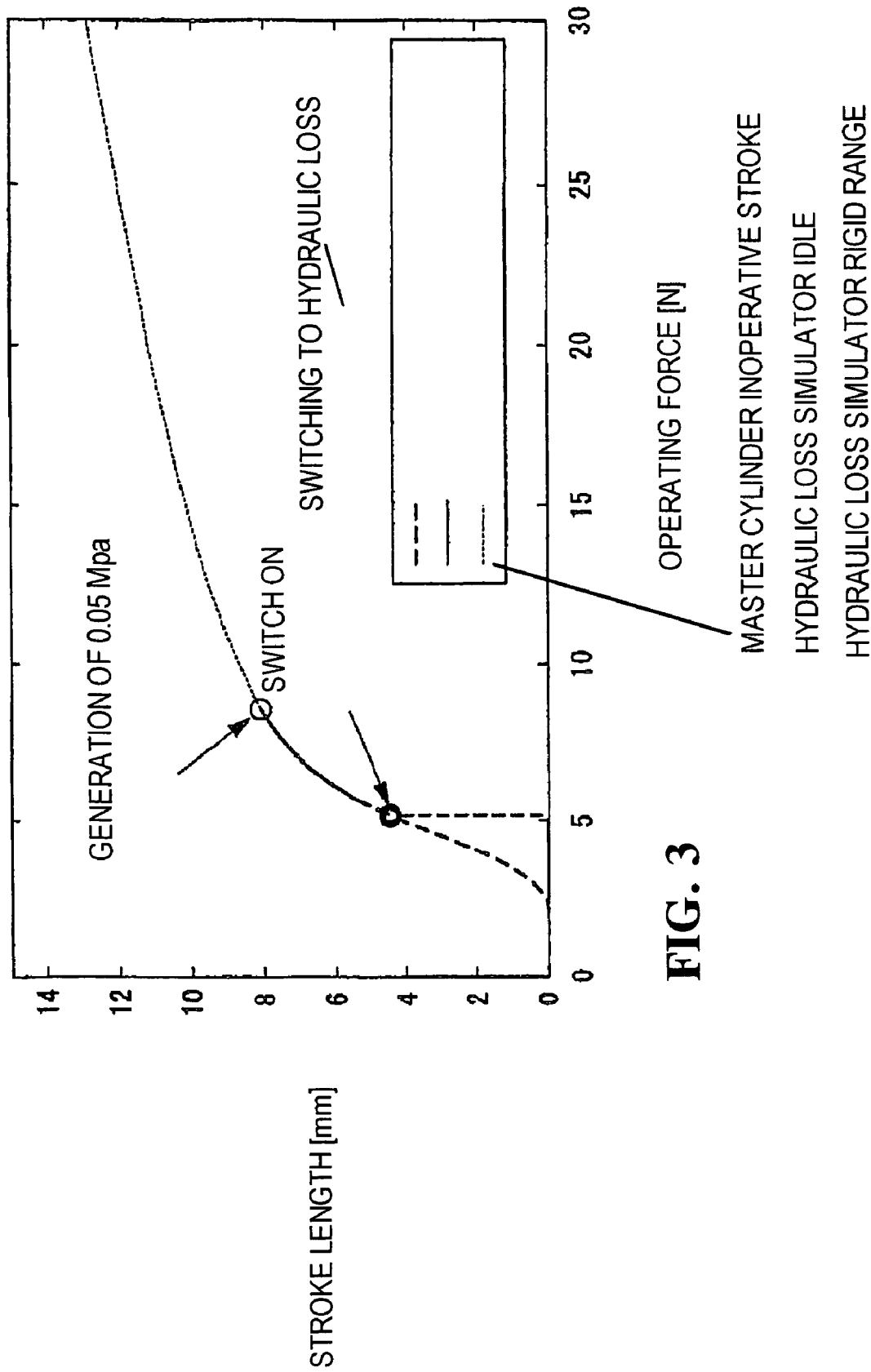
FIG. 3 is a graph showing the operating force relative to the length of stroke traveled by a lever or pedal of a brake operating unit according to the first embodiment of the present embodiment.

FIG. 3 shows a variation in the operating force [N], represented by the horizontal axis, of the lever or pedal of the brake operating unit 2 relative to the length of stroke [mm], represented by the vertical axis, traveled by the brake operating unit 2. As shown in FIG. 3, when, after operation of the brake operating unit 2 is started, the length of stroke traveled by the lever or pedal, hereinafter referred to simply as the "stroke length," increases up 0 to 5 mm, the operating force of the lever or pedal, hereinafter referred to simply as the "operating force," gently increases from about 2N or 3N to 6N. When the stroke length reaches about 4 mm, the brake light switch 32 detects the operation of the brake operating unit 2, and the controller 20 effects switching to the standby state. The stroke length in a range of 0 to 5 mm is the inoperative stroke range, represented by the thick broken-line portion of the curve in FIG. 3, of the master cylinder 3. In the range, the increase in the hydraulic pressure generated by the master cylinder 3 is very small relative to the increase in the stroke length.

When the stroke length exceeds 5 mm, switching to the standby state is completed, and the hydraulic loss simulator 9 starts operation. The hydraulic loss simulator idle range, represented by the thick line portion of the curve in FIG. 3, lasts until the stroke length further increases to about 8 mm. The range is represented by a quadratic curve which indicates that, initially, when the stroke length is about 5 mm, the operating force gently increases in response to the increase in the stroke length and that, subsequently, the rate of the operating force increase gradually rises.

When an upper limit portion, with the stroke length reaching about 8 mm, of the hydraulic loss simulator 9 idle range is reached, the hydraulic pressure in the branch passage 8 on the master cylinder 3 side rises, and a pressure exceeding a minimum pressure detectable by the pressure sensor 28, for example, about 0.05 MPa, is applied to the pressure sensor 28. Subsequently, the hydraulic loss simulator rigid range, represented by the thin broken-line portion of the curve in FIG. 3, is entered, where the hydraulic pressure generated by the hydraulic loss simulator 9 increases substantially linearly in response to the increase in the stroke length. At this time, the controller 20 controls the driving of the electric motor 23 so as to start controlling the hydraulic pressure applied to the brake caliper 4 based on the result of detection by the pressure sensor 28.

In the above configuration, while the vehicle is stopped (vehicle speed=0), the first electromagnetic on-off valve V1 is in an open position whereas the second and third electromagnetic on-off valves V2 and V3 are in a closed position as shown in FIG. 1 in each of the front-wheel brake circuit 1a and the rear wheel brake circuit 1b. In this state, the electromagnetic on-off valves V1 to V3 require no electric power.

Figure 2:
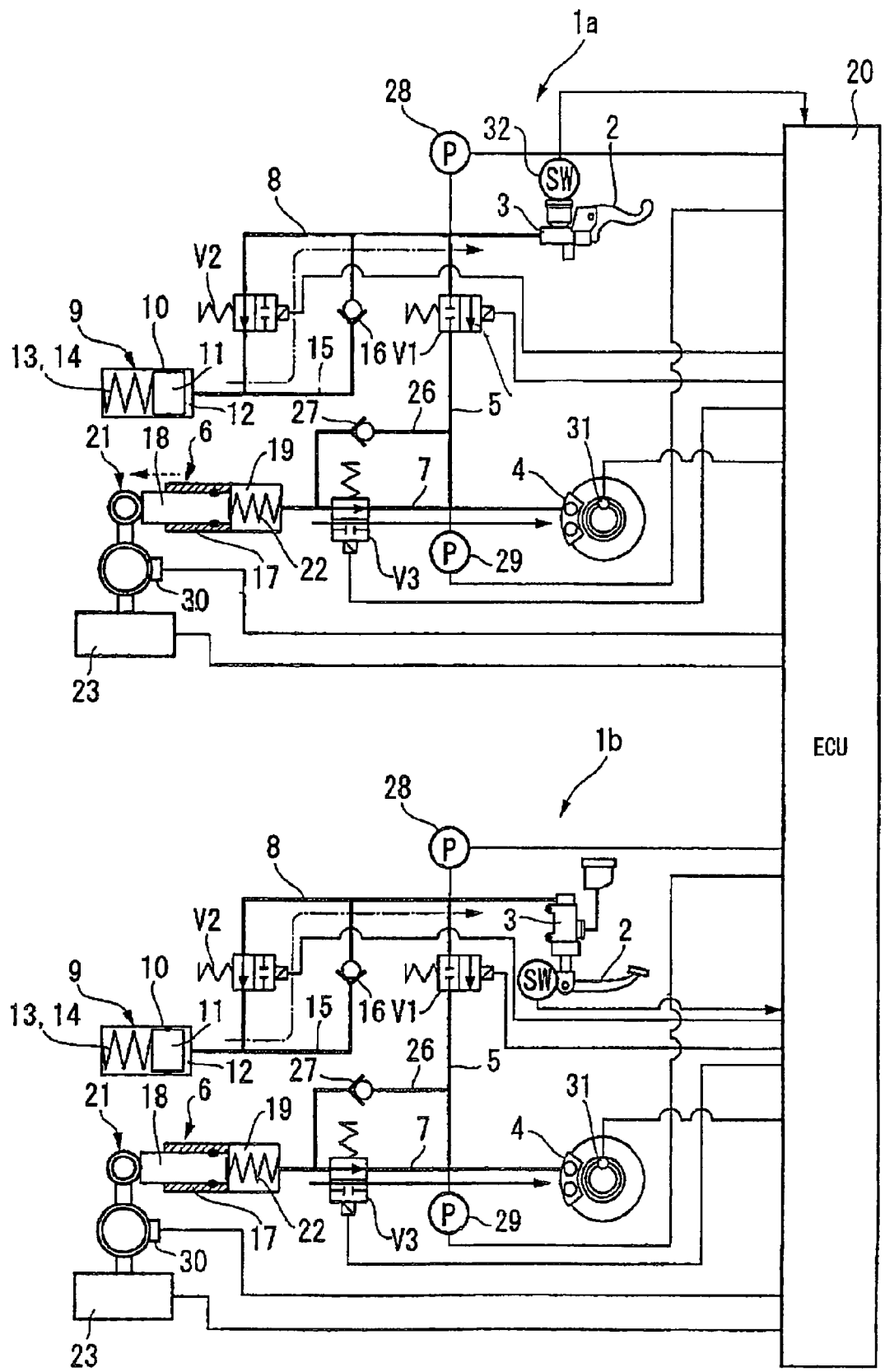
FIG. 2 is a hydraulic circuit diagram showing the motorcycle brake system of FIG. 1 in a state in which braking has been effected and the front-wheel ABS has been activated according to the first embodiment of the present embodiment.

When the vehicle is operated, the rider operates the brake lever, i.e. the brake operating unit 2 for the front wheel, first, the brake light switch 32 detects the brake lever operation. As a result, in accordance with a command from the controller 20, the first electromagnetic on-off valve V1 is closed and the second and third electromagnetic on-off valves V2 and V3 are opened in the front wheel brake circuit 1a as shown in FIG. 2. This generates the standby state. Namely, when the first electromagnetic on-off valve V1 is closed, the main brake passage 5 is isolated from the master cylinder 3. At the same time, opening of the second electromagnetic on-off valve V2 causes the master cylinder 3 and the hydraulic loss simulator 9 to be communicated with each other via the branch passage 8 and the main brake passage 5, and opening of the third electromagnetic on-off valve V3 causes the hydraulic modulator 6 and the brake caliper 4 to be communicated with each other via the supply and drain passage 7 and the main brake passage 5 in the standby state.

At the same time, in the rear wheel brake circuit 1b, too, the first electromagnetic on-off valve V1 is closed, the second and third electromagnetic on-off valves V2 and V3 are opened, and thereby the standby state is entered. Namely, when the first electromagnetic on-off valve V1 is closed, the main brake passage 5 is isolated from the master cylinder 3. At the same time, opening of the second electromagnetic on-off valve V2 causes the master cylinder 3 and the hydraulic loss simulator 9 to be in communication with each other via the branch passage 8 and the main brake passage 5, and opening of the third electromagnetic on-off valve V3 causes the hydraulic modulator 6 and the brake caliper 4 to be in communication with each other via the supply and drain passage 7 and the main brake passage 5.

With both the front wheel brake circuit 1a and the rear wheel brake circuit 1b having entered the standby state as described above, the pseudo pressure generated by the hydraulic loss simulator 9 in each of the front wheel brake circuit 1a and the rear wheel brake circuit 1b allows the rider to feel the braking operation on both the front wheel and rear wheel sides, see the dotted and dashed line arrows in FIG. 2. At the same time, with the first electromagnetic on-off valve V1 closed, the hydraulic pressure variation caused by the hydraulic modulator 6 becomes no longer transmittable to the rider. Also at the same time, the electric motor 23 of the hydraulic modulator 6 operates causing the cam mechanism 21 to press the piston 18 and thereby pressurize the hydraulic fluid in the hydraulic chamber 19. In this way, the hydraulic pressure under control by the electric motor 23 is applied to the brake caliper 4 via the main brake passage 5, see the solid line arrows in FIG. 2.

When the front wheel speed sensor 31 detects that the front wheel or rear wheel, that is, the front wheel in the case shown in FIG. 2, is slipping to be possibly locked, the controller 20, by controlling the electric motor 23, makes the piston 18 retreat, as shown by a broken-line arrow in FIG. 2, so as to reduce the braking pressure of the brake caliper 4 and enable the ABS control to prevent the wheel from being locked. At this time, the first electromagnetic on-off valve V1 is closed, and the master cylinder 3 and the hydraulic modulator 6 are not communicated with each other. Therefore, the pressure variation caused by the ABS control is not transmitted to the brake operating unit 2 being operated by the rider.

Described above is a case in which the vehicle is braked to a stop by operating the brake operating unit 2 without causing the ABS to be activated. Similar control is possible also in a case in which the vehicle is braked to a stop causing the ABS to be activated. When the ABS is activated, the ABS reduces, maintains, and re-increases the pressure in the hydraulic chamber 19. Depending on when the vehicle is stopped, which of the pressure on the master cylinder 3 side and the pressure on the brake caliper 4 side is greater cannot be determined. Whether for increasing or decreasing the pressure in the hydraulic chamber 19, it is possible to electrically, accurately, easily, and freely adjust the position of the piston 18 that is determined by the rotational position of the cam mechanism 21 by placing the electric motor 23 under PWM control inclusive of forward/reverse control and adjusting the amount of electric current that is determined based on an input duty ratio.

According to the above embodiment, therefore, when the operation of the brake operating unit 2 is started, the operation is detected regardless of the hydraulic pressure in the main brake passage 5 on the master cylinder 3 side or in the branch passage 8, and the hydraulic loss simulator 9 is operated with the main brake passage 5 blocked by the first electromagnetic on-off valve V1. This enables the rider to obtain a feeling of the braking operation equivalent to that obtainable from a related-art brake system in which the master cylinder 3 and the brake caliper 4 are directly connected to each other.

With the brake light switch 32 also used as a switch to detect the starting of the braking operation, the increase in the number of components can be suppressed.

It is possible, while smoothly increasing the operating force in response to the increase in the stroke length of the brake operating unit 2, to control the hydraulic modulator 6 based on the result of the detection by the pressure sensor 28 and to provide the brake caliper 4 with a predetermined amount of hydraulic pressure, so that the braking force can be controlled with higher accuracy.

In a case in which the brake light switch 32 keeps outputting an ON signal while the rider is driving the motorcycle with his or her fingers placed on the brake operating unit 2 with no intention to operate it, the standby state generated by the electromagnetic on-off valves V1, V2, and V3 is canceled upon the elapsing of a predetermined amount of time. This makes it possible to reduce power consumption.

The present invention is not limited to the above embodiment. It may, for example, be applied to a vehicle which is not a motorcycle. Even though, in the first embodiment, a brake light switch is used also as a switch to detect a braking operation, a discrete switch different from the brake light switch may be used to detect braking operation. The master cylinder inoperative stroke range, caliper rollback range, hydraulic loss simulator idle range, and hydraulic loss simulator rigid range are peculiar to each brake system, so that they may differ between brake systems. Even though the first embodiment has been described based on an example of a case in which the front wheel brake operating unit is operated earlier than the rear wheel brake operating unit, the description also applies to a case in which the rear wheel brake operating unit is operated earlier than the front wheel brake operating unit.

Next, a second embodiment of the present invention will be described with reference to FIGS. 5 to 12. Whereas, in the first embodiment, a change in the stroke caused when the brake operating unit 2 is operated is detected by the brake light switch 32, it is detected by a discrete stroke sensor different from the brake light switch 32 in the second embodiment. The stroke sensor installation structure of the second embodiment will be described based on an example of the brake operating unit 2 installed to a right handlebar. In the following description of the second embodiment, the same parts as those used in the first embodiment will be assigned the same reference numerals as in the first embodiment and overlapping descriptions will be omitted.

In FIGS. 5 to 12, a right handlebar 40 includes, as main parts, a throttle grip 42 provided on a handlebar pipe 41 and used for acceleration, and a brake operating unit 2 for braking. Throttle cables 43 are connected to the base end side of the throttle grip 42. When the throttle grip 42 is rotated, a throttle valve (not shown) is opened or closed. A weight 44 for preventing the handlebar from vibrating is attached to an end portion of the handlebar pipe 41.

The brake operating unit 2 is provided with a master cylinder 3 which, interlocking with a brake lever 45, generates a hydraulic pressure. A holder 47 is formed at a base portion of a master cylinder body 46 included in the master cylinder 3. The master cylinder body 46 is fixedly clamped to the handlebar pipe 41 by the holder 47. A reserve tank 49 storing hydraulic fluid for the master cylinder 3 is fixed to the holder 47 via a bracket 48. The hydraulic fluid is supplied from the reserve tank 49 to the master cylinder 3 via a hose 50.

Figure 10:
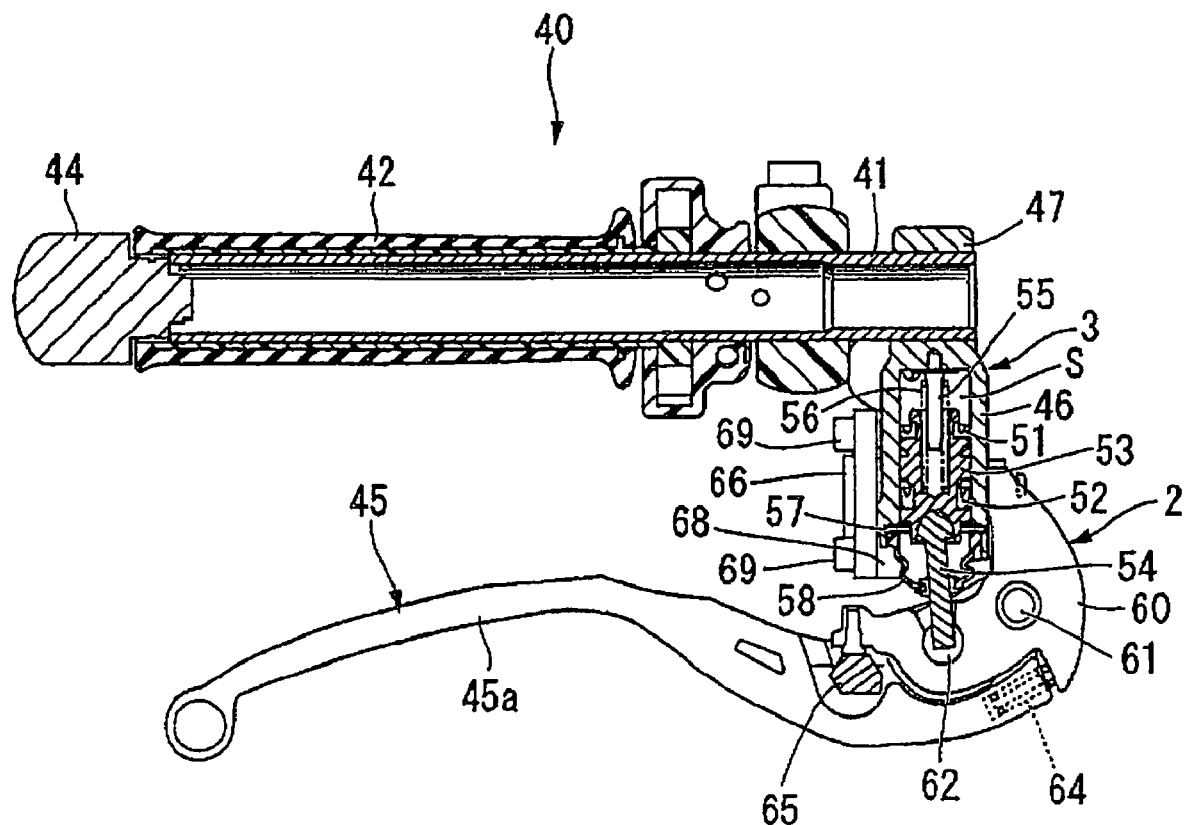
FIG. 10 is a cross-sectional view taken along line A-A in FIG. 6 showing the second embodiment of the present invention.
Figure 11:
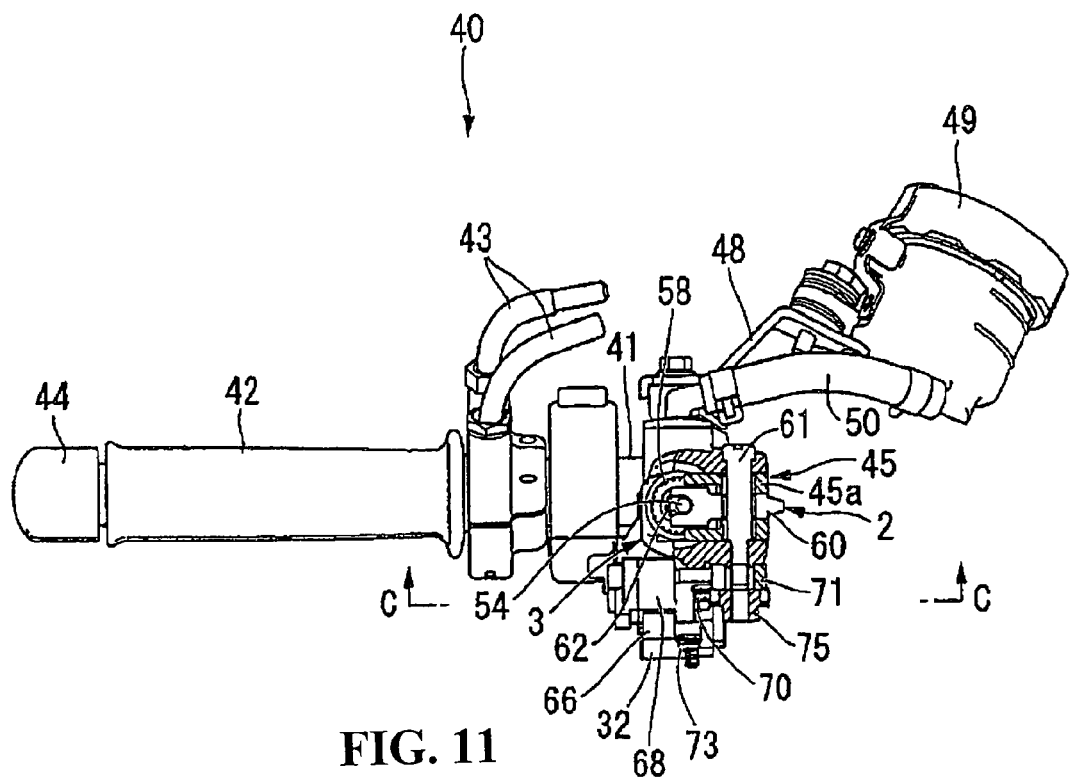
FIG. 11 is a cross-sectional view taken along line B-B in FIG. 5 showing the second embodiment of the present invention.

As shown in FIG. 10, a piston 53 to which a primary cup 51 and a secondary cup 52 are attached is housed, to be movable either way in a direction perpendicular to the handlebar pipe 41, in the master cylinder body 46. The piston 53 can be pushed toward the handlebar pipe 41 by a push rod 54. When the piston 53 is pushed by the push rod 54, a hydraulic chamber S formed between the master cylinder body 46 and the piston 53 is compressed. A return spring 56 guided by a guide rod 55 is provided in the hydraulic chamber S. The return spring 56 keeps pushing the piston 53 toward the push rod 54. When the push rod 54 stops pushing the piston 53, the piston 53 is pushed by the return spring 56 to returns to its initial position. The initial position of the piston 53 is defined by a circlip 57 provided in an opening portion of the master cylinder body 46. A boot 58 is provided for preventing dust infiltration is provided on the piston 53 side of the push rod 54.

A support part 59 (see FIG. 5) is formed integrally with a portion on the vehicle-front side of the master cylinder body 46. A knocker 60 included in a base portion of the brake lever 45 is swingably supported by the support part 59 via a pivot bolt (rotary shaft) 61. The knocker 60 is a substantially L-shaped member extending from a position along a side wall, on the inner side in the vehicle width direction, of the master cylinder body 46 to the vehicle front side of the master cylinder body 46. A joint 62, with which an end portion of the push rod 54 is engaged, is formed (see FIG. 10) on a portion, on the vehicle front side where the knocker 60 is positioned, of the master cylinder body. An extension 63 (see FIG. 8), which is, in a related art, used as a part to work on a brake light switch 32, is formed projecting downwardly in an end portion on the handlebar pipe 41 side of the knocker 60.

A lever body 45a extending outwardly in the vehicle width direction is swingably supported by the knocker 60. An end portion of the lever body 45a is pushed toward the throttle grip 42 by a return spring 64 (see FIG. 10) provided between the knocker 60 and the lever body 45a. The distance between the outer end portion in the vehicle width direction of the lever body 45a and the throttle grip 42 can be fine adjusted by an adjustment dial 65.

When the brake lever 45 is operated, the knocker 60 is swung about the pivot bolt 61, and the push rod 54 is pushed toward the handlebar pipe 41. As a result, the piston 53 travels, opposing the reaction force of the return spring 56, in the direction for compression that is perpendicular to the handlebar pipe 41. This generates a hydraulic pressure in the hydraulic chamber S. When the brake lever 45 is released, the return spring 56 pushes the piston 53 back to its initial position causing the knocker 60 to be pushed back. When the knocker 60 is pushed back, an inner side portion in the vehicle width direction of the knocker 60 hits the side wall of the master cylinder body 46. Since the knocker 60 is no longer swingable, the brake lever 45 is held in a corresponding position. The hydraulic chamber S is communicated with the main brake passage 5 described for the first embodiment.

Figure 12:
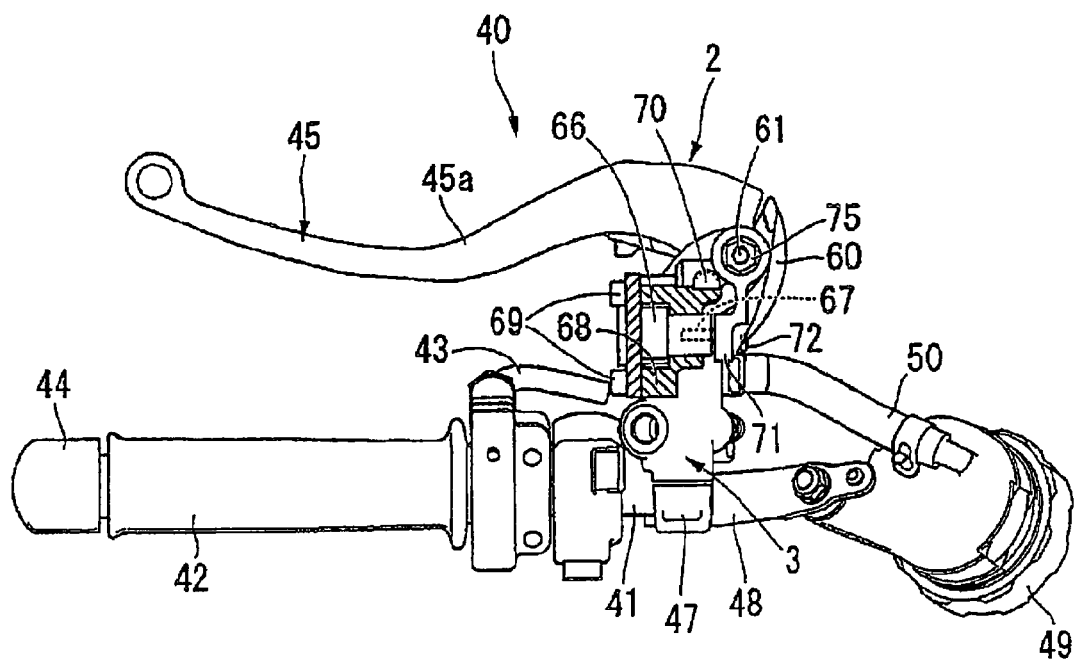
FIG. 12 is a cross-sectional view taken along line C-C in FIG. 11 showing the second embodiment of the present invention.

The brake operating unit 2 is, as shown in FIG. 12, provided with a stroke sensor 66. The stroke sensor 66 detects the operation of the brake lever 45, particularly, the operation in the master cylinder 3 in the inoperative stroke range, and outputs a detection signal to the controller 20 (see FIG. 1). The stroke sensor 66 is a contact-type stroke sensor for detecting a linear displacement. Like the brake light switch 32 used in the first embodiment, it can detect the operation of the brake operating unit 2 while the stroke length is still smaller (for example, about 4 mm) than required by the pressure sensor 28 to output this detected signal.

To be more concrete, the stroke sensor 66 is provided with a detection rod 67 which is kept pushed toward the inner side in the vehicle width direction and which can move along a stroke in a direction substantially perpendicular to the axial direction of the master cylinder 3. The stroke sensor 66 outputs a signal corresponding to the stroke length traveled by the detection rod 67 to the controller 20. The stroke sensor 66 is fixed to a sensor holder 68, which is fixed by a screw 70 to the underside of the master cylinder body 46, by bolts 69 to be disposed in parallel with the handlebar pipe 41 positioned downwardly of the master cylinder body 46.

Figure 7:
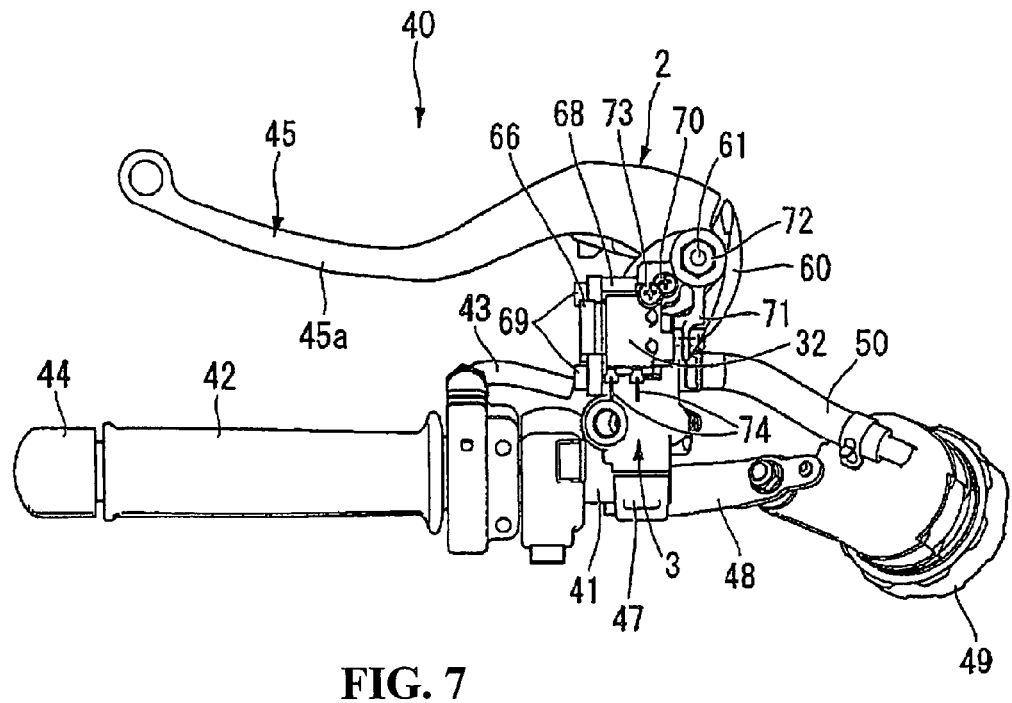
FIG. 7 is a bottom view of the brake operating unit according to the second embodiment of the present invention.
Figure 8:
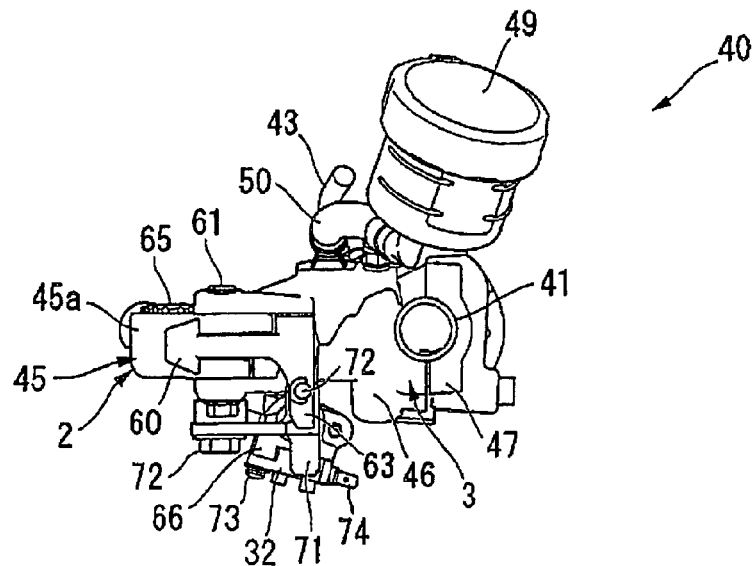
FIG. 8 is a right side view of the brake operating unit according to the second embodiment of the present invention.
Figure 9:
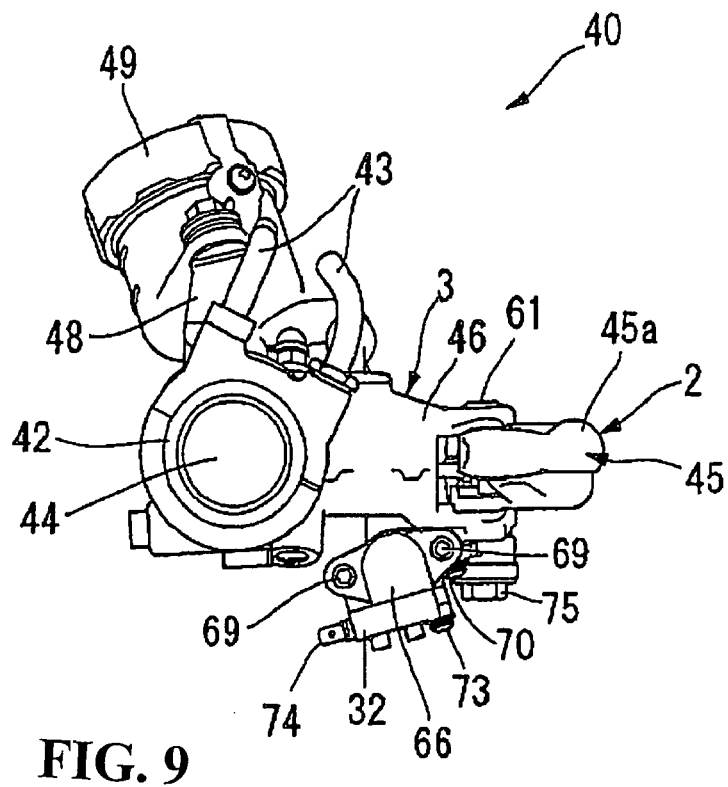
FIG. 9 is a left side view of the brake operating unit according to the second embodiment of the present invention.

An extension arm (arm member) 71 is fixed by a screw 72 to the extension 63 of the knocker 60 such that it extends downwardly from the extension 63. The extension arm 71 is arranged to be swingable integrally with the knocker 60 that is supported by a lower portion of the pivot bolt 61 and included in the brake lever 45. To be more concrete, as shown in FIG. 7, a mounting hole for inserting the pivot bolt 61 is formed in a base portion of the extension arm 71. The base portion of the extension arm 71 is positioned sandwiched between the master cylinder body 46 and a coaxial nut 75 screwed as a tightener to a lower threaded portion of the pivot bolt 61. The extension arm 71 is crank-shaped extending from the base portion toward the handlebar pipe 41 up to where it is bent toward the stroke sensor 66. An end portion of the crank-shaped extension arm 71 is fixed by the screw 72 to the extension 63 of the knocker 60 in a configuration in which it is pushed from the outer side in the vehicle width direction by the detection rod 67 that is pushed toward the inner side in the vehicle width direction. In FIG. 7, the brake lever 45 is shown in an unoperated state.

A brake light switch 32 for turning on and off a brake light (not shown) is fixed by a screw 73 to an underside of the stroke sensor 66. The brake light switch 32 is provided with a detection member (not shown). In a state in which the brake lever 45 is not operated, i.e. when the detection member is pushed against an end portion of the extension arm 71, the contact of the brake light switch 32 is open. In a state in which the brake lever 45 is operated, i.e. when the end portion of the extension arm 71 is displaced away from the detection member and the detection member is released from the end portion of the extension arm 71, the contact of the brake light switch 32 is closed. The brake light switch 32 has an outwardly exposed terminal 74 connected to the brake light. Namely, when the detection member is pushed by the extension arm 71, the brake light is off, and, when the detection member is not pushed by the extension arm 71, the brake light is on. It is for drawing convenience that the terminal 74 is shown with nothing connected to it. In actual applications, wiring to the brake light is connected to the terminal 74.

When the rider holds the brake lever 45 of the brake operating unit 2 causing an end portion of the brake lever 45 to be pulled toward the throttle grip 42, the knocker 60 swings about the pivot bolt 61. As a result, the extension 63 and the extension arm 71 fixed to the extension 63 are displaced away from the master cylinder body 46. This causes the detection rod 67 of the stroke sensor 66 pushing the extension arm 71 to be displaced in an extending direction along its stroke by a distance corresponding to the magnitude of swinging of the knocker 60. The stroke sensor 66 then outputs information on the displacement of the detection rod 67 to the controller 20.

According to the second embodiment, the stroke sensor 66 is disposed downwardly of the master body 46 and in parallel with the handlebar pipe 41. It therefore causes no change in the rider's view and gives no uncomfortable feeling to the rider.

Since the detection rod 67 of the stroke sensor 66 is displaced in the extending direction corresponding to the manipulated variable of the brake lever 45, the operating load of the brake lever 45 does not increase. Even if an external force causes the brake lever 45 to be operated beyond an assumed range of stroke, no excessive stress is applied to the stroke sensor 66. This prevents the stroke sensor 66 from being destroyed.

The stroke sensor 66 can detect the operation of the brake lever 45 as early as when the brake lever 45 is still in the master cylinder inoperative stroke range. Thus, the operation of the brake operating unit 2 can be detected earlier than in a case in which the operation of the brake operating unit 2 is detected, as in a related art, based on a change in the brake hydraulic pressure. Therefore, some leeway is provided before a hydraulic pressure which can actually execute braking is reached. This makes it possible to reduce the power capacity of the electric motor 23 and miniaturize the electric motor 23 that used to be large so as to output large power required to quickly drive the hydraulic modulator 6 in a short amount of time.

The extension arm 71 can be fixed by a screw to the extension 63 of the knocker 60, and the stroke sensor 66 can be fixed by bolts 69 to the sensor holder 68. The arrangement can be easily adopted by partly modifying the shape of the existing brake operating unit 2.

Generally, the brake operating unit 2 incorporates two pressure sensors on its input side for failure detection. At least one of them can be replaced with the stroke sensor 66. This results in a cost reduction.

The axial direction of the master cylinder 3 and the direction of the extension of the detection rod 67 are arranged to be substantially perpendicular to each other, so that configurations along the two directions can be made to be compact. Therefore, the merchantability of the brake system can be improved without impairing its external look.

The detection rod 67 of the stroke sensor 66 can linearly move along its stroke corresponding to the turning of the brake lever 45, so that the operation of the brake lever 45 can be detected with higher accuracy.

Figure 13:
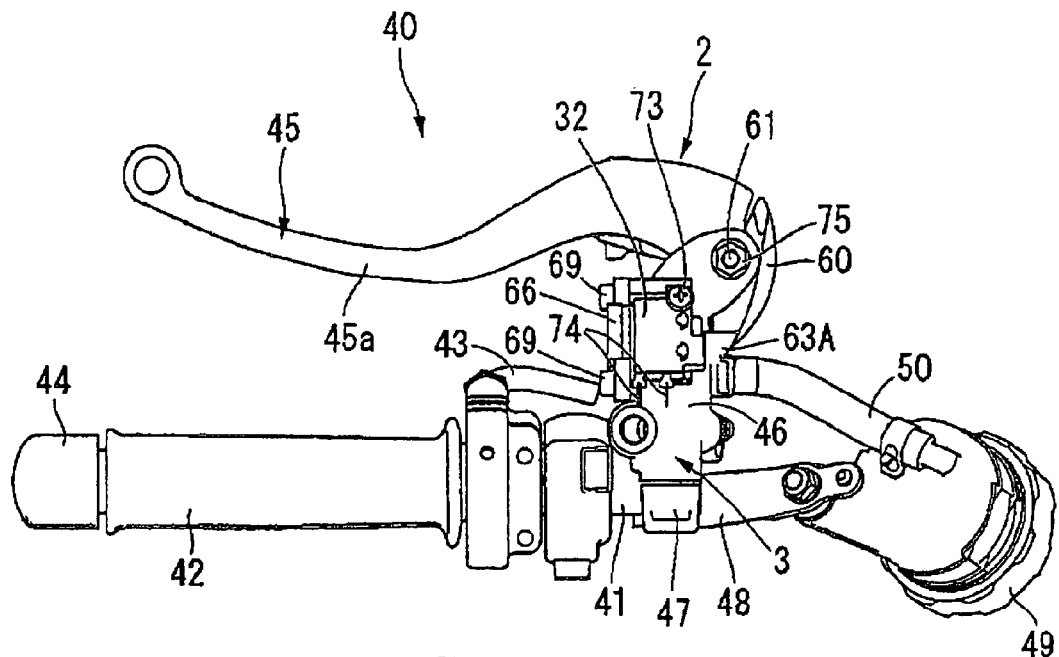
FIG. 13 is a bottom view, equivalent to FIG. 7, of another aspect of the second embodiment of the present invention.
Figure 14:
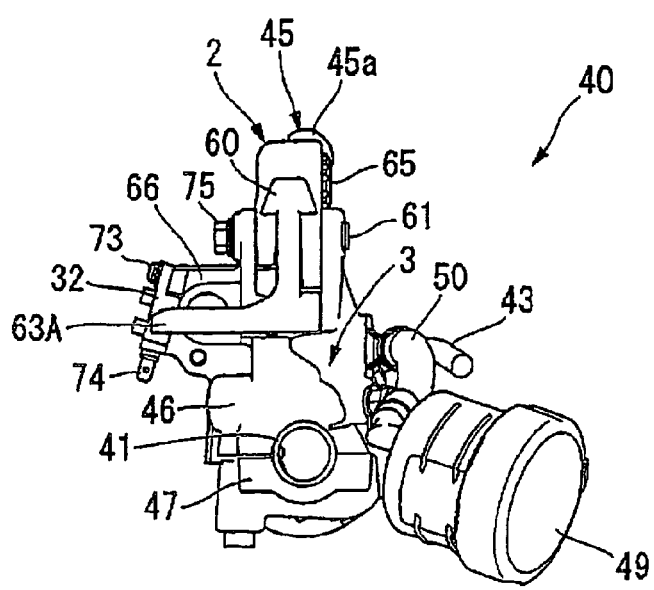
FIG. 14 is a right side view, equivalent to FIG. 8, of another aspect of the second embodiment of the present invention.

In the second embodiment, the extension arm 71 is fixed to the extension 63, and the sensor holder 68 is fixed to the master cylinder body 46 by the screw 70. However, as shown in FIGS. 13 and 14, the knocker 60 may be provided with an extension 63A integrally combining the extension 63 and the extension arm 71, and the master cylinder body 46 and the sensor holder 68 may be integrally formed, allowing the stroke sensor 66 to be fixed thereto. Such a configuration allows the number of components to be reduced for cost reduction.

Even though the above description is based on a case in which the stroke sensor 66 is provided in the brake operating unit 2 of the right handlebar 40, the stroke sensor 66 may be installed on the brake pedal side.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle brake system, comprising:
a brake operating unit for generating hydraulic pressure in a master cylinder;
a braking unit for applying a braking force corresponding to a supplied hydraulic pressure to a wheel;
a first on-off valve for blocking a brake passage connecting the brake operating unit and the braking unit, thereby isolating a portion on the brake operating unit side of the brake passage and a portion on the braking unit side of the brake passage from each other;
a first hydraulic sensor which is provided on the brake operating unit side of the brake passage and for detecting hydraulic pressure;
a modulator for supplying a predetermined amount of hydraulic pressure to the braking unit based on a result of detection by the first hydraulic sensor; and
a hydraulic loss simulator for supplying a reaction force to the brake operating unit when the brake passage is blocked, the motorcycle brake system allocating said braking force to front and rear wheels by controlling the modulator based on a result of detection by the first hydraulic sensor;
wherein the brake operating unit has a switch for detecting starting of operation thereof; and
wherein the first on-off valve blocks the brake passage based on a result of detection by the switch and unblocks the brake passage when a predetermined amount of time elapses, the brake switch outputs an ON signal, and a predetermined minimum detectable pressure is not detected by said first hydraulic sensor.

2. The motorcycle brake system according to claim 1, wherein the switch is a brake light switch for lighting a brake light.

3. The motorcycle brake system according to claim 2, wherein, when said predetermined amount of pressure is detected by the first hydraulic pressure sensor, the operation of the first on-off valve is started regardless of the result of detection by the switch, and the modulator supplies a predetermined amount of hydraulic pressure to the braking unit.

4. The motorcycle brake system according to claim 1, wherein, when said predetermined amount of pressure is detected by the first hydraulic pressure sensor, the operation of the first on-off valve is started regardless of the result of detection by the switch, and the modulator supplies a predetermined amount of hydraulic pressure to the braking unit.

5. The motorcycle brake system according to claim 1, wherein the switch comprises a stroke sensor for detecting a manipulated variable of braking by moving in a direction of stroke extension.

6. The motorcycle brake system according to claim 5, wherein the stroke sensor is disposed downwardly of the master cylinder.

7. The motorcycle brake system according to claim 5, wherein the stroke sensor is disposed such that the direction of stroke extension is substantially perpendicular to an axial direction of the master cylinder.

8. The motorcycle brake system according to claim 7, wherein the stroke sensor is journalled to a rotary shaft of a brake lever included in the brake operating unit and is caused, by an arm member turning integrally with the brake lever, to move along a stroke.

9. The motorcycle brake system according to claim 1, wherein the brake operating unit is connected to the hydraulic pressure loss simulator via at least one of a second on-off valve and a first check valve allowing a hydraulic fluid to flow from the hydraulic loss simulator toward the master cylinder of the brake operating unit.

10. The motorcycle brake system according to claim 1, wherein the modulator is connected to the braking unit via at least one of a third on-off valve and a second check valve.

11. The motorcycle brake system according to claim 1, and further comprises a second hydraulic sensor provided on the braking unit side of the brake passage for detecting hydraulic pressure.

12. The motorcycle brake system according to claim 1, and further comprises wheel speed sensor detecting a speed of the wheel.

13. The motorcycle brake system according to claim 12, wherein the modulator further comprises:
an electric motor for adjusting the hydraulic pressure of the modulator; and
an angle sensor detecting a angle information of a cam mechanism of the modulator.

14. The motorcycle brake system according to claim 13, wherein the electric motor of the modulator is controlled based on signals detected by the first hydraulic sensor, the second hydraulic sensor, the angle sensor of the modulator and the wheel sensor.

15. A brake system, comprising:
a brake operating unit for generating hydraulic pressure in a master cylinder;
a braking unit for applying a braking force corresponding to a supplied hydraulic pressure;
a first on-off valve for blocking a brake passage connecting the brake operating unit and the braking unit, thereby isolating a portion on the brake operating unit side of the brake passage and a portion on the braking unit side of the brake passage from each other;
a first hydraulic sensor provided on the brake operating unit side of the brake passage and for detecting hydraulic pressure;
a modulator for supplying a predetermined amount of hydraulic pressure to the braking unit based on a result of detection by the first hydraulic sensor; and
a hydraulic loss simulator for supplying a reaction force to the brake operating unit when the brake passage is blocked, the brake system allocating said braking force to a front and rear brake by controlling the modulator based on a result of detection by the first hydraulic sensor;
wherein the brake operating unit has a switch for detecting starting of operation thereof; and
wherein the first on-off valve blocks the brake passage based on a result of detection by the switch and unblocks the brake passage when a predetermined amount of time elapses, the brake switch outputs an ON signal, and a predetermined minimum detectable pressure is not detected by said hydraulic sensor.

16. The brake system according to claim 15, wherein the switch is a brake light switch for lighting a brake light.

17. The brake system according to claim 16, wherein, when said predetermined amount of pressure is detected by the first hydraulic sensor, the operation of the first on-off valve is started regardless of the result of detection by the switch, and the modulator supplies a predetermined amount of hydraulic pressure to the braking unit.

18. The brake system according to claim 15, wherein, when said predetermined amount of pressure is detected by the first hydraulic sensor, the operation of the first on-off valve is started regardless of the result of detection by the switch, and the modulator supplies a predetermined amount of hydraulic pressure to the braking unit.

19. The brake system according to claim 15, wherein the switch comprises a stroke sensor for detecting a manipulated variable of braking by moving in a direction of stroke extension.

20. The brake system according to claim 19, wherein the stroke sensor is disposed downwardly of the master cylinder.

21. The brake system according to claim 19, wherein the stroke sensor is disposed such that the direction of stroke extension is substantially perpendicular to an axial direction of the master cylinder.

22. The brake system according to claim 21, wherein the stroke sensor is journalled to a rotary shaft of a brake lever included in the brake operating unit and is caused, by an arm member turning integrally with the brake lever, to move along a stroke.

23. The brake system according to claim 15, wherein the brake operating unit is connected to the hydraulic pressure loss simulator via at least one of a second on-off valve and a first check valve allowing a hydraulic fluid to flow from the hydraulic loss simulator toward the master cylinder of the brake operating unit.

24. The brake system according to claim 15, wherein the modulator is connected to the braking unit via at least one of a third on-off valve and a second check valve.

25. The brake system according to claim 15, and further comprises a second hydraulic sensor provided on the braking unit side of the brake passage for detecting hydraulic pressure.

26. The brake system according to claim 15, and further comprises a wheel speed sensor for detecting a speed of the wheel.

27. The brake system according to claim 26, wherein the modulator further comprises:
   an electric motor for adjusting the hydraulic pressure of the modulator; and
   an angle sensor detecting a angle information of a cam mechanism of the modulator.

28. The brake system according to claim 27, wherein the electric motor of the modulator is controlled based on signals detected by the first hydraulic sensor, the second hydraulic sensor, the angle sensor of the modulator and the wheel sensor.

* * * * *